UNITED STATES PATENT OFFICE.

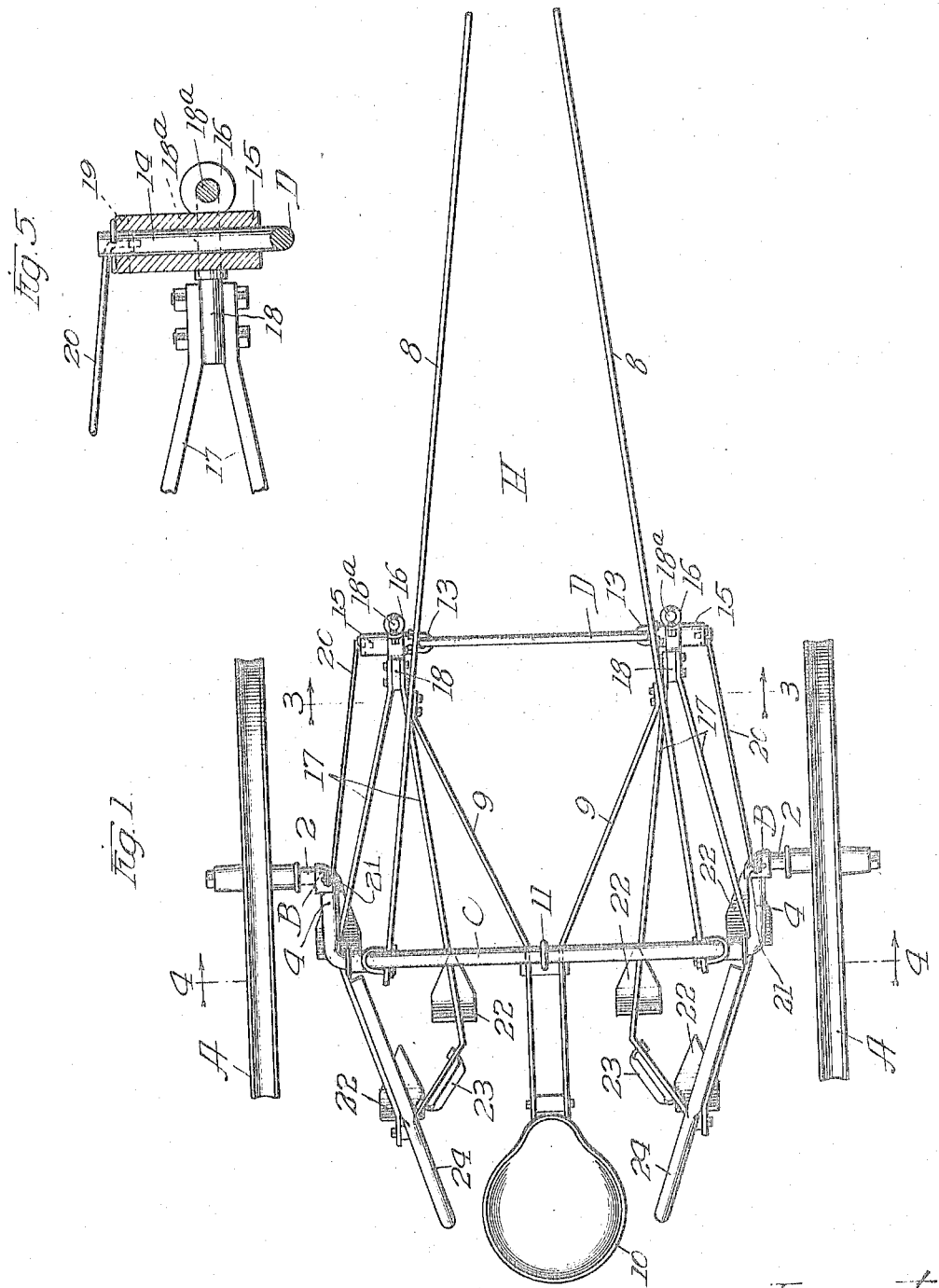

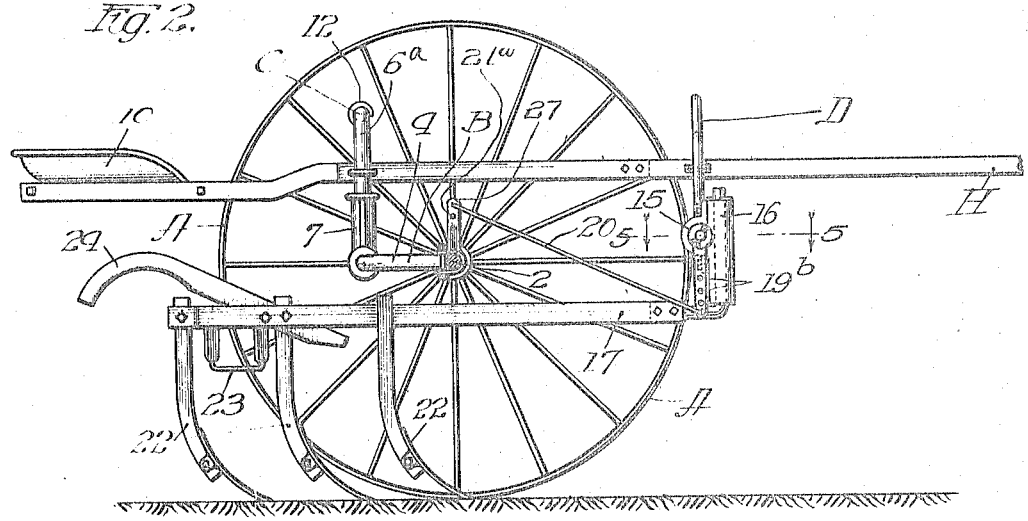

SAMUEL H. TINSMAN, OF MORRIS, ILLINOIS.

CULTIVATOR.

1,283,974.  Specification of Letters Patent.  Patented Nov. 5, 1918.

Application filed December 26, 1916. Serial No. 138,742.

*To all whom it may concern:*

Be it known that I, SAMUEL H. TINSMAN, a citizen of the United States of America, and resident of Morris, Grundy county, Illinois, have invented a certain new and useful Improvement in Cultivators, of which the following is a specification.

My invention relates to improvements in cultivators, and one of the objects of my invention is to provide an improved cultivator which will be simple, durable and reliable in construction, effective and efficient in operation and inexpensive to manufacture.

Other objects of my invention will appear hereinafter.

My invention consists in the features of novelty exemplified in the construction, combination and arrangement of parts hereinafter described, shown in the accompanying drawings and more particularly set forth in the appended claims.

Referring to the accompanying drawings:

Figure 1 is a top plan view of an improved cultivator embodying my invention;

Fig. 2 is a view in side elevation of the structure shown in Fig. 1 with one of the supporting wheels removed, the view being taken substantially on the line 2—2 of Fig 1;

Fig. 3 is a transverse vertical section taken substantially on the line 3—3 of Fig. 1;

Fig. 4 is a transverse vertical section taken substantially on the line 4—4 of Fig. 1; and Fig. 5 is taken substantially on the line 5—5 of Fig. 3, being an enlarged detail of one of the yoke members and its connections at the forward end of the shovel gangs.

It will be obvious to one skilled in the art, after having obtained an understanding of my invention from the disclosures herein made, that the structure shown in the drawings, and which embodies my invention, is capable of modification and reorganization of parts without departing from the scope and spirit of the invention, and I desire it to be so understood.

The cultivator structure which I have shown in the drawings has two large supporting wheels A spaced apart the proper distance and axially alined. Each of these wheels is journaled on an axle member B which, by reference more particularly to Fig. 2, will be seen to consist of two horizontal portions 2 and 3 offset with respect to each other, and a substantially right angled connecting portion 4. The portions 2 of the two axle members are extended outwardly and axially alined and form suitable axles upon which the supporting wheels are journaled. The portions 3 are positioned rearwardly of the axle portions 2 and are likewise alined. These portions 3 are journaled in horizontal bearings formed by the castings 5, these being suitably fastened in the bearings 5 by cotter pins 6 or otherwise in such manner that they may be readily removed when desired. These S-shaped members thus in a sense form what might be termed crank axles, the center of which is the axis of the supporting wheels. The portions 3 could be made, of course, as part of a straight bar extending from side to side of the machine and in alinement with the bearings 5. However, I desire to provide a cultivator which shall be open and have unrestricted space between the wheels so as not to interfere either with the view of the operator or with the plants which are being cultivated. For this reason I provide an arch member C which rises to a sufficient height above the axis of the wheels to provide the proper clearance. This arch has a horizontal portion and two downwardly extending legs 6ª which are secured at their lower ends in sockets 7 of the bearing members 5. This arch thus connects the two sides of the cultivator together in rigid relation in all respects except as to the function and operation of the cranks hereinbefore referred to. Two long tongue or pole members 8 are firmly and rigidly secured to the legs 6ª of the arch C by U-bolts or other suitable clamps suitable for this purpose. These tongue members, as shown more clearly in Fig. 1, converge forwardly being fastened together at their forward ends by any suitable means but which do not appear on the drawings. Two diagonal members 9, as shown in Fig. 1, are securely fastened to the pole members 8. These diagonal members are disposed in substantially the same plane as the pole members 8 and converge rearwardly to a point below the arch C and then extend rearwardly in parallel relation so as to serve as a support for a suitable seat 10 for the operator. The weight of the seat and operator is imposed upon the arch C by a suitable link 11 which is bolted to a small cross strap on the members 9 and which has a hook 12 formed at its upper end by which it may be hooked over and suspended from the arch C. This is done for the reason that I intend this structure as one which will utilize the weight of the operator not only for taking up the weight of the cultivator gangs and assist in lifting them but also for the purpose of maintaining the cultivator gangs in a balanced condition. Some distance forward of the rear arch C I provide a bail member D which is positioned substantially vertical and which rises above the draft members so as to leave plenty of clearance and not interfere with either the operator's view or with the plants being cultivated. This bail D is fastened to the tongue or pole members 8 in any suitable manner, as for instance by means of the U-bolts 13. The ends 14 of this bail are turned laterally and are journaled in castings 15 so that these castings may be rotated about horizontal alined axes. These castings also have vertical bearing portions 16 in which the forward ends of the cultivator plow or shovel beams 17 are journaled, the plow beams being attached to end members 18 which have upturned ends 18ª, as shown clearly in Figs. 2 and 3. This construction provides a universal pivotal mounting for the forward ends of the plow beams which permits them to swing laterally, or vertically. The castings 15 also have depending arms 19 preferably formed integrally therewith. These arms are connected by links or tension rods 20 with upwardly extending links 21 which are rigidly and securely fastened to the crank axles, as shown in Fig. 2. The plow beam 17 in this particular structure consists of bars for each set of shovels. These bars or beams diverge rearwardly and the shovels 22 are mounted on standards which depend from the beams 17 and are disposed in their proper relation. These shovels may be of the usual or any improved construction. Each gang has a stirrup 23 disposed in such manner that the operator may place his feet therein to operate the gangs. Each gang also has a handle 24 disposed in a conveniently accessible position for the operator.

The parts are all so proportioned that the weight of the operator in the seat practically balances the weight of the gangs. The weight of the operator tends to rotate the crank axles downwardly and rearwardly. This movement of the crank axle is communicated through the links 21 and 19 and the tension rod 20 to the casting at the forward ends of the shovel beams and tends to swing the shovel beams upwardly about their forward pivots. The effect of the weight of the operator is practically compensated for by the weight of the shovel gangs and the suction or resistance offered by the ground when the plows are operated. Since these forces acting in this manner are practically balanced the operator need exert but very little effort to raise the gangs clear of the ground when he wishes to transport the machine from place to place. In like manner when he is operating the structure in the act of cultivating the raising and lowering of the gangs requires very little effort. The lateral shifting of the gang is of course permitted as before mentioned by the universal pivotal connection at the forward ends of the plow beams. I have made this particular construction adjustable to the weight of the particular operator by providing a series of holes 19ª and 21ª in the links 18 and 21 respectively. The ends of the tension links 20 may be hooked into any of these holes to vary the leverage exerted by these arms—that is to say, to vary the effective length of the said arms. In this manner the adjustment can be determined very accurately and thus render the machine adaptable to the weight of the particular operator and to the operating conditions. It is thus seen that I have provided an extremely simple construction composed of a minimum number of parts. With the attendant reduction in the cost of manufacture I am enabled to dispense entirely with the usual complicated gang lifting mechanism, such as springs and the like. Being a balanced mechanism the operator is able to handle the structure with a minimum amount of effort. The operator has a clear unobstructed view along the rows of plants which it is cultivating. Furthermore since the structure is practically entirely open and unobstructed throughout its entire central length it will not damage the plants being cultivated.

I claim:

1. In a cultivator the combination of a pair of supporting wheels, an arch axle for said wheels adapted to be swung vertically, a tongue extending forwardly and supported by said arch axle for movement therewith in response to a weight imposed upon said arch axle, shovel beams pivotally supported by said tongue and adapted to swing vertically and means interconnecting the arch axle and shovel beams for causing the weight and resistance of the shovel beams to be balanced by the weight imposed upon the arch axle and comprising lever arms attached to the arch axle and to the pivotal point of the shovel beams and tension links connected to said arms on the arch axle and shovel beams respectively.

2. In a cultivator the combination of a pair of supporting wheels, a crank axle for each wheel, an arch-shaped member having bearings at its ends in which said crank axles are journaled, a tongue carried by said arch member and having a seat for the operator so as to impose the weight of the operator on said crank axles, a pair of shovel beams having shovels at their rear ends and pivotally supported by said tongue at their forward ends so as to move vertically, and means for causing the weight of the operator to be exerted on the beams in a direction to lift said beams and comprising arms on the crank axles movable in a rearward direction when the beams are raised and links connecting said arms with said beams.

3. In a cultivator the combination of a pair of supporting wheels, a crank axle for each wheel, an arch-shaped member having bearings at its ends in which said crank axles are journaled, a tongue carried by said arch member and having a seat for the operator so as to impose the weight of the operator on said crank axles, a second arch member supported by said tongue forward of the first mentioned arch member, shovel beams having shovels at their rear ends and pivotal connections at their forward ends with the second arch member, lever arms rigidly connected to and operable about the pivotal point of said beams, arms on the crank axles movable rearwardly when the beams are raised and tension links connecting the arms on the axles with corresponding arms on the shovel beams.

4. In a cultivator, a pair of supporting wheels, a crank axle on which said wheels are mounted, a shovel beam pivotally mounted at its forward end for rotation about a horizontal axis, a link connected to said axle, a second link connected to the pivotal end of said beam, and a rod connecting said links, whereby rotation of said axle causes corresponding rotation of said shovel beam.

5. In a cultivator, a pair of supporting wheels, a crank axle on which said wheels are mounted, a driver's seat mounted on said axle, whereby the weight of the driver causes rotation of said axle, a shovel beam pivotally mounted at its forward end on a horizontal axis, an upwardly extending link rigidly connected to said axle, a downwardly extending link rigidly connected to the pivotal end of said beam, and a rod connecting said links, whereby oscillating movement of said axle, due to the weight of the driver, is imparted to said shovel beams.

6. In a cultivator, a pair of supporting wheels, a crank axle on which said wheels are mounted, a driver's seat mounted on said axle, whereby the weight of the driver causes rotation of said axle, a shovel beam pivotally mounted at its forward end on a horizontal axis, an upwardly extending link rigidly connected to said axle, a downwardly extending link rigidly connected to the pivotal end of said beam, and a rod connecting said links, whereby oscillating movement of said axle, due to the weight of the driver, is imparted to said shovel beams, the connection between said rod and links being adjustable to compensate for the variation in weights of drivers.

Signed by me at Battle Creek, Mich., this 20th day of Dec., 1916.

SAMUEL H. TINSMAN.

Witnesses:
O. K. CUMMINGS,
E. E. SAYLES.